United States Patent
Broussev et al.

(10) Patent No.: US 9,118,241 B2
(45) Date of Patent: Aug. 25, 2015

(54) SWITCHED-MODE POWER SUPPLY AND A TWO-PHASE DC TO DC CONVERTER HAVING SWITCHES AND A FILTER THAT DELIVER CURRENT FROM A NODE AMONG CONVERTER STAGES

(75) Inventors: Svetozar Broussev, Tampere (FI); Nikolay Tchamov, Tampere (FI)

(73) Assignee: Intel Deutschland GmbH, Neubiberg (DE)

( * ) Notice: Subject to any disclaimer, the term of this patent is extended or adjusted under 35 U.S.C. 154(b) by 86 days.

(21) Appl. No.: 13/495,089

(22) Filed: Jun. 13, 2012

(65) Prior Publication Data

US 2013/0336012 A1   Dec. 19, 2013

(51) Int. Cl.
| | |
|---|---|
| G05F 1/24 | (2006.01) |
| H02M 1/15 | (2006.01) |
| H02M 3/158 | (2006.01) |
| H02M 1/00 | (2007.01) |

(52) U.S. Cl.
CPC .............. *H02M 1/15* (2013.01); *H02M 3/1584* (2013.01); *H02M 2001/0054* (2013.01); *H02M 2003/1586* (2013.01); *Y02B 70/1491* (2013.01)

(58) Field of Classification Search
CPC .............. H02M 3/158; H02M 3/1582; H02M 2001/0045; H02M 3/1588; H02M 3/1584; H02M 3/156; G05F 1/30; G05F 1/24; G05F 1/445
USPC ......... 323/225, 259, 263, 268, 271, 272, 344, 323/350, 351
See application file for complete search history.

(56) References Cited

U.S. PATENT DOCUMENTS

| | | | |
|---|---|---|---|
| 3,351,848 A | 11/1967 | Lodder | |
| 4,800,476 A | 1/1989 | Harada et al. | |
| 5,592,367 A | 1/1997 | Sugimori et al. | |
| 6,215,290 B1 | 4/2001 | Yang et al. | |
| 6,249,156 B1 | 6/2001 | Attwood | |
| 6,304,065 B1 * | 10/2001 | Wittenbreder | 323/259 |
| 6,429,632 B1 * | 8/2002 | Forbes et al. | 323/282 |
| 6,819,088 B2 | 11/2004 | Shenai et al. | |
| RE40,907 E * | 9/2009 | Steigerwald et al. | 363/39 |
| 7,672,147 B1 * | 3/2010 | Schutten et al. | 363/39 |
| 7,791,905 B2 | 9/2010 | Smet et al. | |
| 7,839,667 B2 | 11/2010 | Liao et al. | |
| 8,030,909 B2 | 10/2011 | Ma et al. | |
| 8,063,671 B2 | 11/2011 | Xiao | |
| 8,212,537 B2 | 7/2012 | Carpenter et al. | |

(Continued)

OTHER PUBLICATIONS

U.S. Appl. No. 13/495,108, filed Jun. 13, 2012.

(Continued)

*Primary Examiner* — Adolf Berhane
*Assistant Examiner* — Alex Torres-Rivera
(74) *Attorney, Agent, or Firm* — Eschweiler & Associates, LLC

(57) ABSTRACT

The switched-mode power supply includes a first switch connected to an input terminal for receiving an input voltage, a second switch, a first node between the first switch and the second switch. The switched-mode power supply further includes a third switch connected to the input terminal, a fourth switch, and a second node between the third switch and the fourth switch. A first inductor is connected between the first node and an output terminal, a second inductor is connected between the second node and the output terminal, at least one third inductor is connected between the first node and the second node, and a capacitor is connected to the output terminal.

29 Claims, 8 Drawing Sheets

(56) References Cited

U.S. PATENT DOCUMENTS

| | | | |
|---|---|---|---|
| 8,248,047 B2 | 8/2012 | Zhou | |
| 8,369,109 B2 | 2/2013 | Niedermeier et al. | |
| 8,436,594 B2 | 5/2013 | Fu et al. | |
| 8,536,803 B2 | 9/2013 | Sadwick et al. | |
| 8,587,269 B2 | 11/2013 | Salato | |
| 2003/0234636 A1 | 12/2003 | Ruan et al. | |
| 2004/0027101 A1* | 2/2004 | Vinciarelli | 323/259 |
| 2004/0100805 A1 | 5/2004 | Wei et al. | |
| 2006/0012348 A1* | 1/2006 | Zhao et al. | 323/259 |
| 2006/0091871 A1 | 5/2006 | Abedinpour et al. | |
| 2008/0012542 A1 | 1/2008 | Liu et al. | |
| 2008/0157691 A1* | 7/2008 | Lu et al. | 323/361 |
| 2008/0180077 A1* | 7/2008 | Qiu et al. | 323/282 |
| 2010/0181970 A1* | 7/2010 | Yang et al. | 323/218 |
| 2010/0225287 A1* | 9/2010 | Schultz | 323/272 |
| 2010/0246231 A1 | 9/2010 | Sirio et al. | |
| 2011/0204858 A1* | 8/2011 | Kudo | 323/266 |
| 2011/0316503 A1 | 12/2011 | Huang | |
| 2012/0068675 A1 | 3/2012 | Kawagishi et al. | |
| 2012/0068676 A1 | 3/2012 | Kawagishi et al. | |
| 2012/0112715 A1 | 5/2012 | Tong et al. | |
| 2012/0126777 A1* | 5/2012 | Motegi | 323/311 |
| 2012/0146600 A1 | 6/2012 | Xu et al. | |
| 2012/0212196 A1 | 8/2012 | Ozasa | |
| 2013/0280879 A1* | 10/2013 | Stecher et al. | 438/381 |
| 2013/0335048 A1 | 12/2013 | Herzog et al. | |

OTHER PUBLICATIONS

U.S. Appl. No. 13/495,067, filed Jun. 13, 2012.
P.C. Theron et al., "Soft Switching Self-Oscillating IGBT-Based DC-DC Converters", IEEE, 2002, pp. 929-935.
Hiroshi Sakamoto et al., "Self Oscillated PWM Converter with Imulse Resonant Soft-switching", IEEE, 2003, pp. 340-343.
C.F. Lee et al., "A Monolithic Current-Mode CMOS DC-DC Converter With On-Chip Current-Sensing Technique", IEEE, vol. 39, No. 1, pp. 3-14, 2004.
A. A. Fomani et al., "A Segmented Gate Driver with Adjustable Driving Capabilitiy for Efficiency Optimization", IEEE, 2010, pp. 1646-1650.
Jose F. da Rocha et al., "Level Shifters and DCVSL for a Low-Voltage CMOS 4.2-V Buck Converter", IEEE, 2008, pp. 3315-3323.
A. Stratakos et al., "High-Efficiency Low-Voltage DC-DC Conversion for Portable Applications", Wiley-IEEE Press, 1998, ch. 12, pp. 361-397.
In Hwan Oh, "A Soft-Switching Synchronous Buck Converter for Zero Voltage Switching (ZVS) in Light and Full Load Conditions", IEEE, pp. 1460-1464, 2008.
Ehsan Adib et al., "Zero-Voltage-Transition PWM Converters With Synchronous Rectifier", IEEE, vol. 23, No. 1, 2010, pp. 105-110.
Hong Mao et al., "Zero-Voltage-Switching DC-DC Converters With Synchronoius Rectifiers", IEEE, vol. 23, No. 1, 2008, pp. 369-378.
N. Lakshminarasamma et al., "A Family of Auxiliary Switch ZVS-PWM DC-DC Converters With Coupled Inductor", IEEE, vol. 22, No. 5, 2007,0 pp. 2008-2017.
K. I. Hwu et al., "Simple Design of a Soft-Switching Buck Converter", IEEE, 2008, pp. 410-414.
Yingqi Zhang et al., "A New Soft-Switching Technique for Buck, Boost, and Buck-Boost Converters", IEEE, vol. 39, No. 6, 2003, pp. 1775-1782.
Mehdi Alimadadi et al., "A 3GHz Switching DC-DC Vonverter Unsing Clock-Tree Charge-Recycling in 90nm CMOS with Integrated Output Filter", IEEE, 2007, pp. 532, 533, 620.
William A Peterson et al., "A Half Bridge, Self-Oscillating, Multi-Resonant Converter Circuit", IEEE, 1993, pp. 77-84.
Non-Final Office Action dated Nov. 10, 2013 for U.S. Appl. No. 13/495,067. 29 Pages.
Office Action Dated Mar. 28, 2014 U.S. Appl. No. 13/495,067.
Office Action Dated Sep. 18, 2014 U.S. Appl. No. 13/495,067.
Notice of Allowance Dated Jan. 2, 2015 U.S. Appl. No. 13/495,067.
Non Final Office Action Dated Sep. 23, 2014 U.S. Appl. No. 13/495,108.
Notice of Allowance Dated Jan. 22, 2105 U.S. Appl. No. 13/495,108.

* cited by examiner

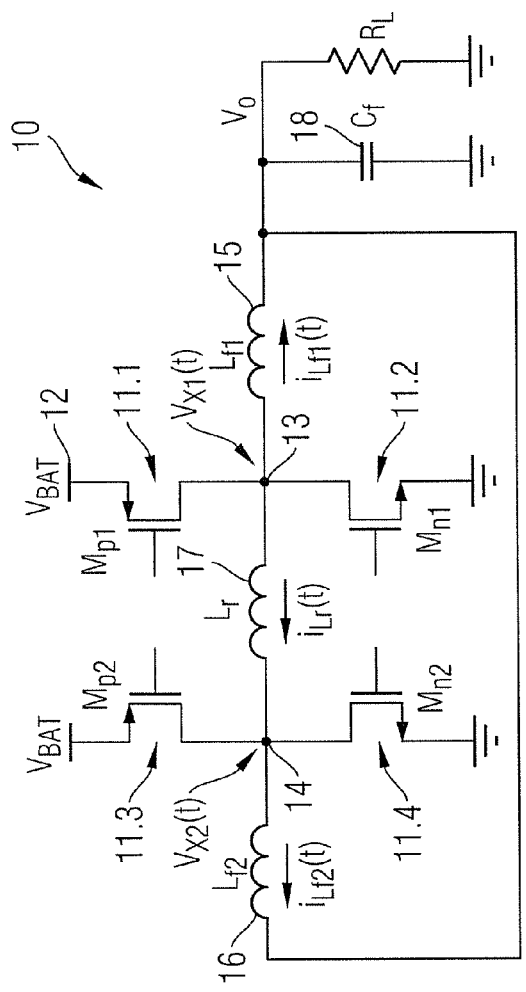
Fig. 1a
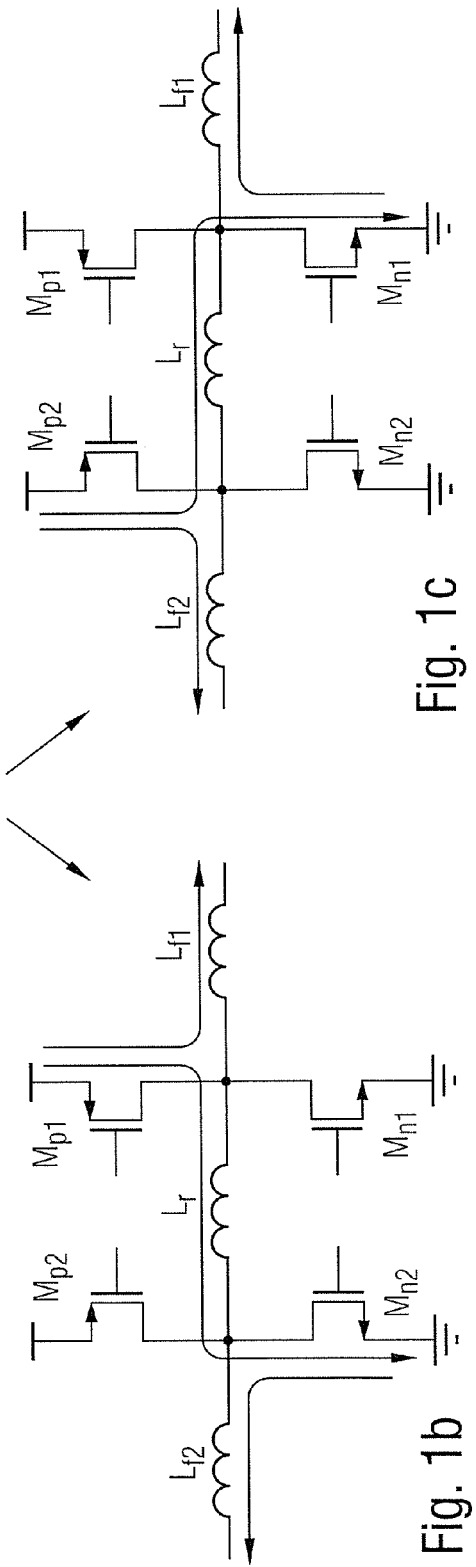
Fig. 1b
Fig. 1c

US 9,118,241 B2

SWITCHED-MODE POWER SUPPLY AND A TWO-PHASE DC TO DC CONVERTER HAVING SWITCHES AND A FILTER THAT DELIVER CURRENT FROM A NODE AMONG CONVERTER STAGES

FIELD

The present invention relates to a switched mode power supply, a two-phase DC to DC converter, and a method for operating a switched-mode power supply.

BACKGROUND

The power supply and voltage regulations for devices such as, for example, a central processing unit, a memory, or peripheral loads become a major challenge due to increasing demands in computing platforms. Recent years show an increasing demand for power supplies and power converters operating at high frequencies. In a power converter such as a buck converter, however, losses occur which are due to ohmic and switching losses. The reduction of the ohmic losses requires a smaller effective resistance of the inductor and the power transistors which can be achieved by making the power transistors bigger. At the same time, however, the parasitic capacitance increases, thus increasing the switching losses. Therefore, one important challenge to a switched-mode power supply is to find a compromise between reducing ohmic and switching losses at the same time.

BRIEF DESCRIPTION OF THE DRAWINGS

The accompanying drawings are included to provide a further understanding of the disclosure and are incorporated in and constitute a part of this specification. The drawings illustrate embodiments and together with the description serve to explain principles of the disclosure. Other variations and many of the intended advantages of embodiments will be readily appreciated as they become better understood by reference to the following detailed description. The elements of the drawings are not necessarily to scale relative to each other. Like reference numerals designate corresponding similar parts.

FIG. 1a illustrates a circuit representation of an exemplary switched-mode power supply according to the disclosure.

FIG. 1b illustrates a circuit representation of FIG. 1a showing in addition the current flow in one particular situation.

FIG. 1c illustrates a circuit representation of FIG. 1a showing in addition the current flow in another particular situation.

FIGS. 2a and 2b illustrate exemplary voltage and current waveforms during operation of the switched-mode power supply of FIG. 1a.

DETAILED DESCRIPTION

Figure 2A:
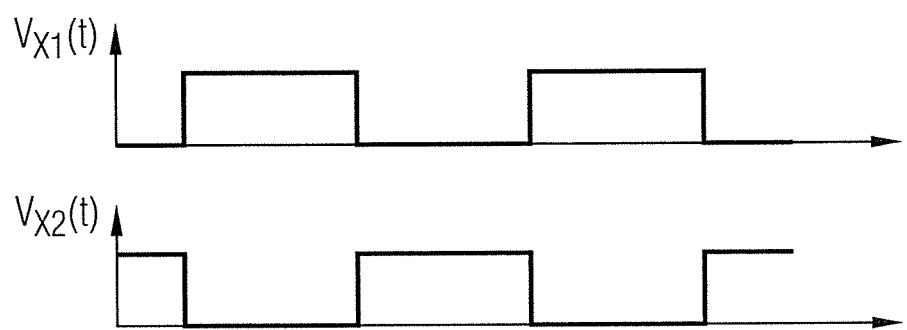

The aspects and embodiments are now described with reference to the drawings, wherein like reference numerals are generally utilized to refer to like elements throughout. In the following description, for purposes of explanation, numerous specific details are set forth in order to provide a thorough understanding of one or more aspects of the disclosure. It may be evident, however, to one skilled in the art that one or more aspects of the embodiments may be practiced with a lesser degree of the specific details. In other instances, known structures and elements are shown in schematic form in order to facilitate describing one or more aspects of the disclosure. It is to be understood that other embodiments may be utilized and structural or logical changes may be made without departing from the scope of the disclosure. It should be noted further that the drawings are not to scale or not necessarily to scale.

In addition, features or aspects disclosed may be combined with one or more other features or aspects of the other implementations as may be desired and advantageous for any given or particular application. The terms "coupled" and "connected", along with derivatives may be used. It should be understood that these terms may be used to indicate that two elements co-operate or interact with each other regardless whether they are in direct physical or electrical contact, or they are not in direct contact with each other. The following detailed description, therefore, is not to be taken in a limiting sense, and the scope of the present invention is defined by the appended claims.

In the following disclosure is directed to a switched-mode power supply. It is to be noted herewith that different kinds of power supplies can be used like, for example, direct current to direct current power converter circuits like buck converter circuits, boost converter circuits, or buck-boost converter circuits, direct current to alternate current converter circuits, or alternate current to direct current converter circuits.

FIG. 1a illustrates a circuit representation of an exemplary switched-mode power supply according to the disclosure. The switched-mode power supply 10 of FIG. 1a comprises a first switch 11.1 ($M_{p1}$) connected to an input terminal 12 for inputting an input voltage $V_{BAT}$, a second switch 11.2 ($M_{n1}$), a first node 13 between the first switch 11.1 and the second switch 11.2, a third switch 11.3 ($M_{p2}$) connected to the input terminal, a fourth switch 11.4 ($M_{n2}$), a second node 14 between the third switch 11.3 and the fourth switch 11.4, a first inductor 15 connected between the first node 13 and an output terminal Vo, a second inductor 16 connected between the second node 14 and the output terminal Vo, at least one third inductor 17 connected between the first node 13 and the second node 14, and a capacitor 18 connected to the output terminal Vo.

The second switch 11.2 and the fourth switch 11.4 can be connected to a ground terminal.

The switched-mode power supply 10 of FIG. 1a thus may also be described as a two-phase direct current to direct current (DC-DC) converter comprising two identical buck converter stages delivering the output current to a common load as represented by resistor $R_L$ in FIG. 1a. A first buck converter stage is comprised of first switch 11.1, second switch 11.2 and first node 13 between first and second switches 11.1 and 11.2, and a second buck converter stage is comprised of third switch 11.3, fourth switch 11.4, and second node 14 between third and fourth switches 11.3 and 11.4.

The first to fourth switches 11.1 to 11.4 can be comprised of transistors, in particular MOS transistors. The first switch 11.1 and the third switch 11.3 can be made of transistors of a first conductivity type, and the second switch 11.2 and the fourth switch 11.4 can be made of transistors of a second conductivity type. In particular, the first switch 11.1 and the third switch 11.3 can be made of PMOS transistors, and the second switch 11.2 and the fourth switch 11.4 can be made of NMOS transistors.

The first to fourth switches 11.1 to 11.4 can be integrated in one and the same semiconductor chip. The passive elements, namely the first to third inductors 15 to 17 and the capacitor 18, or at least a part of these passive elements can either be integrated in one and the same semiconductor chip, in particular the same semiconductor chip in which the switches are arranged. It is also possible that a remaining part of these passive elements or all of these passive elements are arranged in a package, like an encapsulating mold of the semiconductor chip. It is also possible that a remaining part of these passive elements or all of these passive elements are arranged in another semiconductor chip than that in which the switches are arranged.

The first switch 11.1 can be configured to switch the input voltage $V_{BAT}$ to the first node 13, the second switch 11.2 can be configured to switch the first node 13 to a ground potential, the third switch 11.3 can be configured to switch the input voltage $V_{BAT}$ to the second node 14, the fourth switch 11.4 can be configured to switch the second node 14 to the ground potential.

A first LC filter can be comprised of the capacitor 18 and the first inductor 15 and a second LC filter can be comprised of the capacitor 18 and the second inductor 16, wherein the first and second LC filters can be configured to filter signals obtained from the first and second nodes 13 and 14, respectively. The third inductor 17 can be configured to generate an inductive current flowing to either one of the first and second nodes 13 and 14.

The switched-mode power supply 10 of FIG. 1a can further comprise one or more pulse generators (not shown) configured to generate a first pulse-width modulated signal and to supply the first pulse-width modulated signal to the first and fourth switches 11.1 and 11.4, and to generate a second pulse-width modulated signal and to supply the second pulse-width modulated signal to the second and third switches 11.2 and 11.3, and to generate the first and second pulse-width modulated signals in an interleaved manner.

The driving of the first to fourth switches 11.1 to 11.4 can thus be interleaved such that the two inductor currents sum together at the output Vo in order to reduce significantly the voltage ripples. The benefit of operating the two-phase converter of FIG. 1a in such a way is in the reduction of the output voltage ripples that allows using a capacitor 18 of a relatively small capacitance value.

The third inductor 17 can play the role of an auxiliary inductor connected between the two switching nodes 13 and 14 of the two-phase converter 10 of FIG. 1a. The simplified current flow through the inductors 15 and 16 is shown in FIGS. 1b and 1c.

One objective of utilizing the third or auxiliary inductor 17 is to create an auxiliary inductive current to realize zero-voltage switching (ZVS) conditions for the main switching transistors 11.1 to 11.4. The voltage $V_{X1}(t)$ represents the time-dependent voltage at the first node 13, and the voltage $V_{X2}(t)$ represents the time-dependent voltage at the second node 14. FIG. 1b shows a situation in which $V_{X1}=V_{BAT}$ and $V_{X2}=0$.

As shown in FIG. 1b, the NMOS switching transistor 11.4 conducts both the filter inductor current through the second inductor 16 ($i_{Lf2}(t)$) and the current through the third inductor 17 ($i_{Lr}(t)$). During the turn-off process of the NMOS transistor 11.4, the difference between the two inductor currents can be used for charging the parasitic capacitance associated with the second node 14. Similarly, the parasitic capacitance associated with the first node 13 is charged after turning off the second NMOS transistor 11.2 as shown in FIG. 1c.

FIG. 1c shows a situation in which $V_{X1}=0$ and $V_{X2}=V_{BAT}$. No dedicated auxiliary switches, PN diodes, or large capacitors are needed in the architecture of the switched-mode power supply 10 of FIG. 1a in order to achieve the above described operation. The main switching transistors 11.1 and 11.2 of the first converter stage have auxiliary functions for the switching of the second converter stage, and the other way around. Thus, combining the two phases eliminates the need for additional logic and unavoidable losses combined with it.

The capacitance value of the capacitor 18 and the inductance value of the inductors depend on the switching frequency to be achieved. For a switching frequency of about 100 MHz, for example, the capacitance value can be in a range from 0.5 to 1.5 nF, for example, and the inductance values can be in a range from 10 to 30 nH.

Figure 2B:
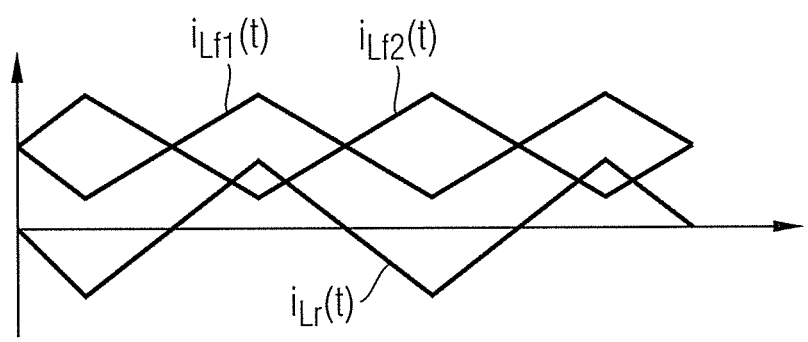

FIGS. 2a and 2b illustrate exemplary voltage and current waveforms of the switched-mode power supply of FIG. 1a. The diagrams show ideal waveforms of the switched-mode power supply having the auxiliary third inductor 17 $L_r$ connected between the $V_{X1}$ node 13 and the $V_{X2}$ node 14. The waveforms of the inductor currents $i_{Lf1}(t)$, $i_{Lf2}(t)$, and $i_{Lr}(t)$ are shown below and in relation to the time-dependent $V_{X1}$ and $V_{X2}$ node voltages.

The $V_{X1}$ and $V_{X2}$ voltages show the interleaved operation of the switched-mode power supply. The two main inductor currents stay positive (in order to reduce the rms (root mean square) value), and zero-voltage switching (ZVS) can not be realized for the low-to-high transition of the $V_{X1(2)}$ node voltage (negative inductor current is needed). However, the current $i_{Lr}(t)$ has opposite polarity to the current $i_{Lf2}(t)$. If max $(i_{Lr}(t))$>min $(i_{Lf2}(t))$, then a negative current flows into the $V_{X2}$ node 14 during the low-to-high transition of $V_{X2}(t)$.

The negative current is used for charging the parasitic capacitance associated with the $V_{X2}$ node 14 from zero to $V_{BAT}$ in a lossless manner by providing an appropriate dead time. Similarly, the $i_{Lr}(t)$ current is used for ZVS switching of the $V_{X1}$ node 13 (the first stage of the buck converter). The condition required to realize self-assisted ZVS switching is max $(i_{Lr}(t))$>min $(i_{Lf1}(t))$=min $(i_{Lf2}(t))$. The value of max$(i_{Lr}(t))$ is controlled by the value of the third auxiliary inductor 17 $(L_r)$.

Since the third auxiliary inductor 17 $(L_r)$ is switched between $V_{BAT}$ and ground, a large inductor may be needed in order to limit the excessive $i_{Lr}(t)$ current.

Figure 3:
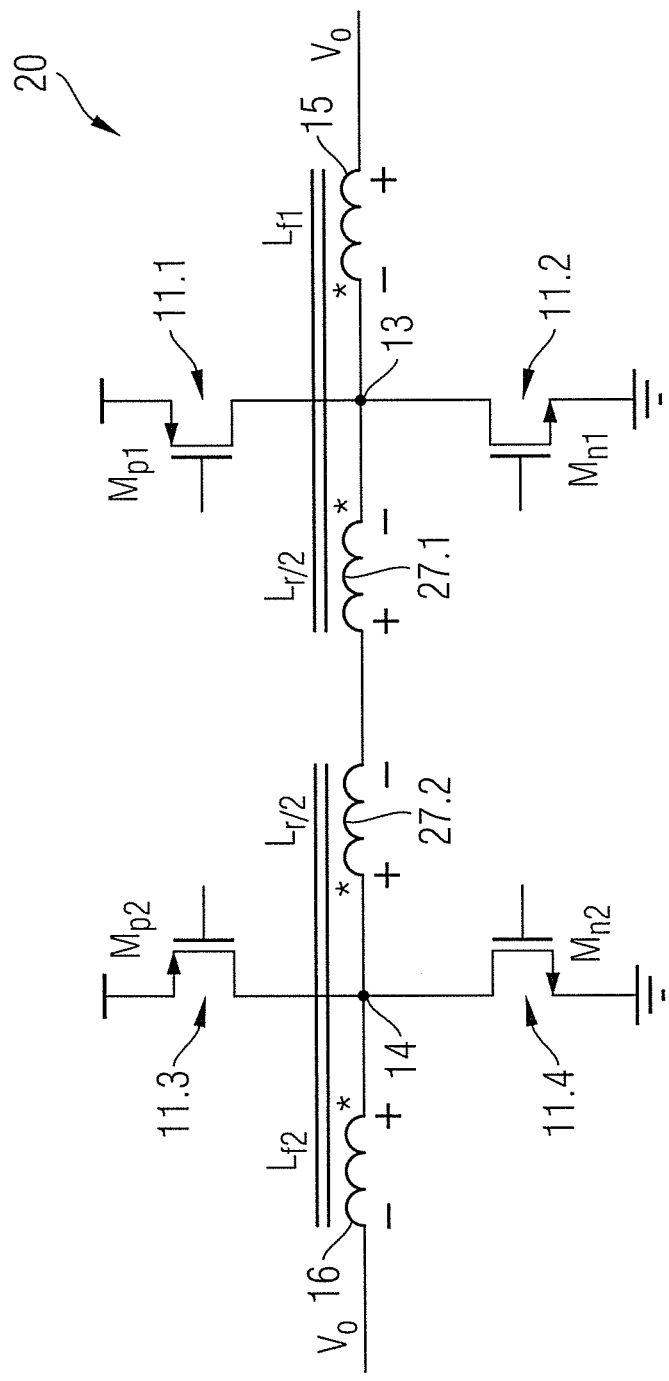
FIG. 3 illustrates a circuit representation of an exemplary switched-mode power supply of the disclosure.

FIG. 3 illustrates a circuit representation of an exemplary switched-mode power supply according to the disclosure. The switched-mode power supply 20 of FIG. 3 can be similar to the switched-mode power supply 10 of FIG. 1 so that, as far as like reference numerals are used again in FIG. 3, the description of the respective elements will not be repeated here.

The switched-mode power supply 20, as shown in FIG. 3, represents an embodiment in which two third auxiliary inductors 27.1 and 27.2 are connected in series between the first and second nodes 13 and 14 and each one of the first and second inductors 15 and 16 is magnetically coupled to one of the third auxiliary inductors 27.1 and 27.2. The magnetic coupling can be in a range from 0.4 to 1.0, for example. The arrangement of the magnetic coupling is made to configure the voltages transferred from the first and second inductors 15 and 16 being opposite to the $V_{BAT}$ voltage. The magnetically-coupled arrangement provides a smaller effective voltage drop over the third auxiliary inductors 27.1 and 27.2, which helps to reduce the value of the $L_r$ inductance.

Furthermore, the voltage transferred from each one of the auxiliary inductors 27.1 and 27.2 to one of the respective first and second inductors 15 and 16 reduces the current ripples of the first and second inductors 15 and 16. Furthermore, the coil combinations $L_{f1}$-$L_r/2$ and $L_{f2}$-$L_r/2$ can be realized as transformers to further reduce the occupied area of the semiconductor chip. The first inductor 15 ($L_{f1}$) can be the upper winding of a first transformer, while the first auxiliary inductor 27.1 ($L_r/2$) could be the lower winding of the first transformer. Furthermore, the second inductor 16 ($L_{f2}$) can be the upper winding of a second transformer, while the second auxiliary inductor 27.2 ($L_r/2$) could be the lower winding of the second transformer. A magnetic coupling in excess of 0.5 could be achieved in such configuration.

Figure 4A:
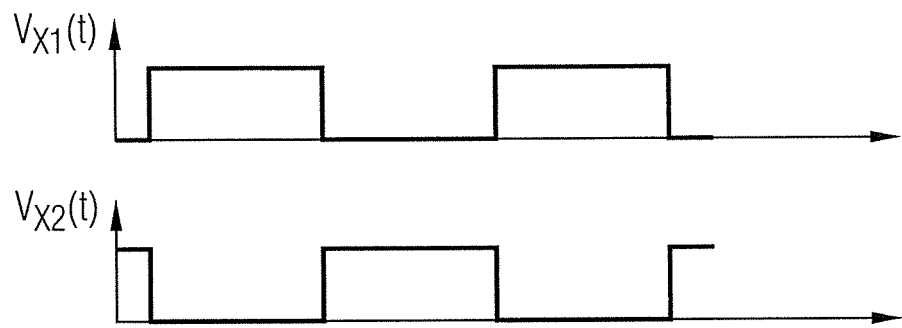
FIGS. 4a-4c illustrate exemplary voltage and current waveforms during operation of either one of the switched-mode power supplies of FIGS. 1 and 3.
Figure 4B:
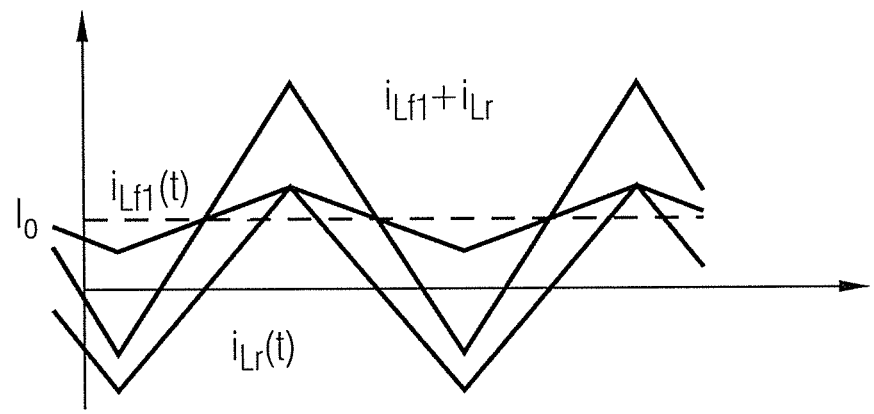
Figure 4C:
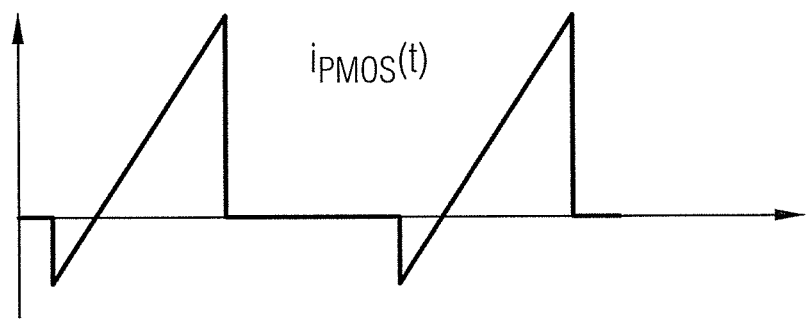
Figure 5A:
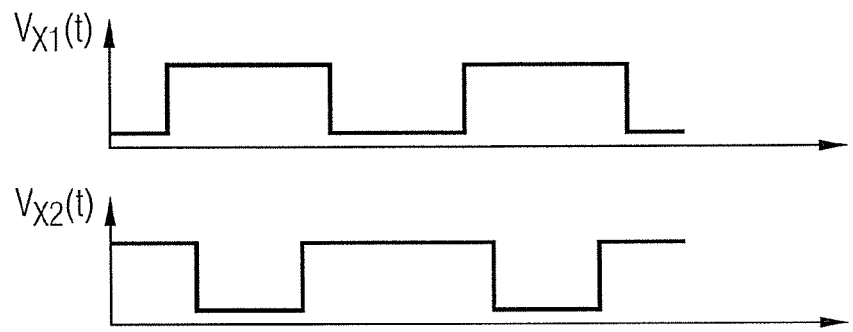
FIGS. 5a and 5b illustrate exemplary voltage and current waveforms for a duty cycle greater than 50%.
Figure 5B:
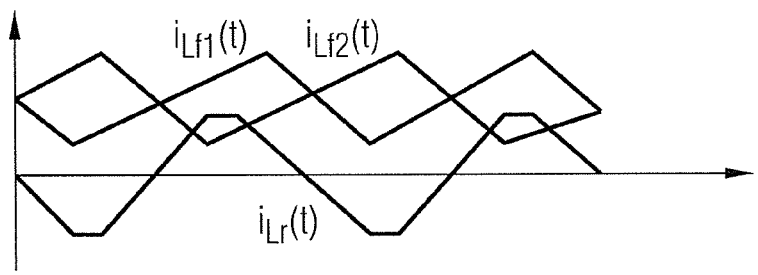
Figure 6A:
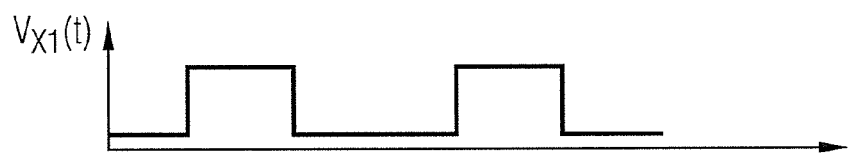
FIGS. 6a and 6b illustrate exemplary voltage and current waveforms for a duty cycle smaller than 50%.
Figure 6B:
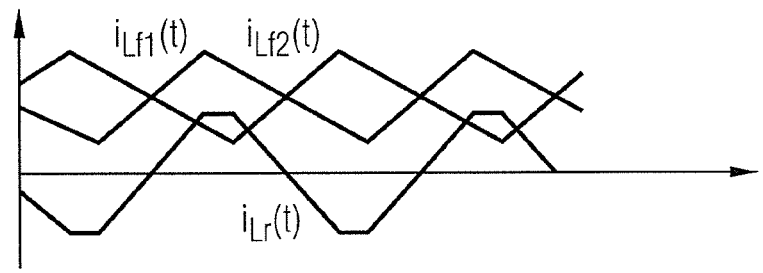

FIGS. 4a-4c illustrate exemplary voltage and current waveforms of either one of the switched-mode power supplies of FIGS. 1 and 3. The voltage waveforms $V_{X1}(t)$ and $V_{X2}(t)$ are assumed to have 50% duty-cycle as in FIG. 2a. In addition to the time diagrams as shown in FIGS. 2a and 2b, FIGS. 4a-4c also show the total current $i_{Lf1}$+$iL_r(t)$ and also the current $i_{PMOS}(t)$ conducted by the PMOS transistors. Although the power transistors have to conduct two currents simultaneously, there are no additional requirements to the power transistors.

FIGS. 5a and 5b and FIGS. 6a and 6b illustrate exemplary voltage and current waveforms of the switched-mode power supply of either one of FIGS. 1 and 3 when the switched-mode power supply is driven with duty cycles different than 50%. The auxiliary current $i_{Lr}(t)$ changes its shape from triangular to trapezoidal. The waveform transformation, however, does not change the principle of operation. The self-assisted ZVS operation is achieved as long as the condition max $(i_{Lr}(t))$>min $(i_{Lf1}(t))$ is satisfied. The $i_{Lr}(t)$ waveform transformation is observed in practice for extreme duty-cycles. The plateau of $i_{Lr}(t)$ occurs when $i_{Lr}$ conducts through PMOS transistors of both stages (duty-cycle>50%), or through the NMOS transistors of both stages (duty-cycle<50%).

Figure 7:
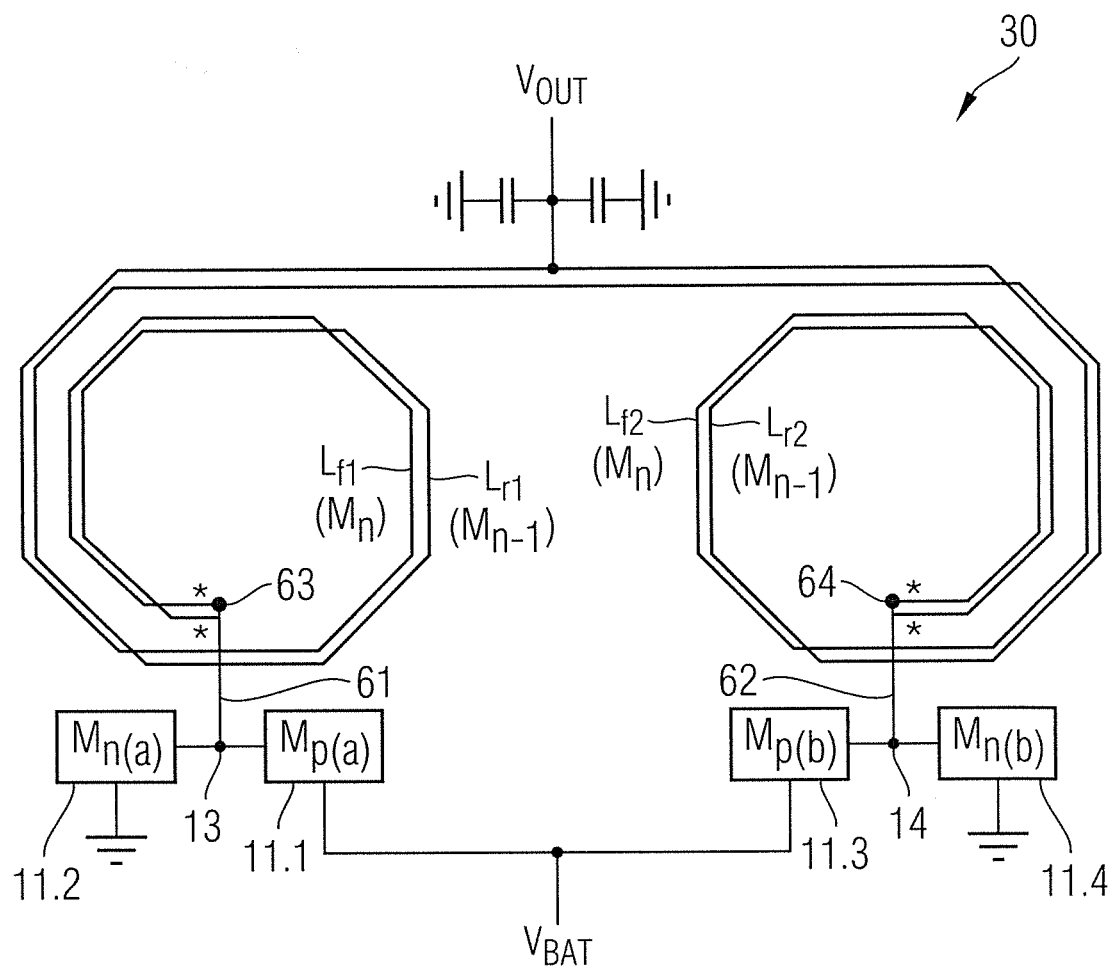
FIG. 7 illustrates a circuit representation of an exemplary switched-mode power supply according to the disclosure.

FIG. 7 illustrates a circuit representation of an exemplary switched-mode power supply according to the disclosure. The switched-mode power supply 30 of FIG. 7 can be similar to the switched-mode power supply 20 of FIG. 3 so that, as far as like reference numerals are used again in FIG. 7, the description of the respective elements will not be repeated here. In addition the switched-mode power supply 30 of FIG. 7 depicts how the different electrical components can be arranged in different metallization layers of the semiconductor chip like the silicon chip or of the chip package. As shown in FIG. 3, the switched-mode power supply 20 comprises a first transformer formed by the first inductor 15 and the first auxiliary inductor 27.1 and a second transformer formed by the second inductor 16 and the second auxiliary inductor 27.1. The first and second transformers can be realized according to FIG. 7 in a straight-forward manner as stacked transformers. It is possible, for example, that one or more of the metallization layers is arranged in the semiconductor chip and one or more of the metallization layers is arranged in the semiconductor chip package.

The first filtering inductor $L_{f1}$, which corresponds to the first inductor 15, could be the upper-most winding of the first transformer which could be arranged in a first upper metallization layer $M_n$ of the silicon chip. The first auxiliary inductor $L_{r1}$, which corresponds to the first auxiliary inductor 27.1, could be the secondary winding of the first transformer realized on a second lower metallization layer $M_{n-1}$ of the silicon chip. Likewise the second main filtering inductor $L_{f2}$, which corresponds to the second inductor 16, could be the upper winding of the second transformer which could be arranged in the first upper metallization layer $M_n$ of the silicon chip. The second auxiliary inductor $L_{r2}$, which corresponds to the second auxiliary inductor 27.2, could be the secondary winding of the second transformer realized on the second lower metallization layer $M_{n-1}$ of the silicon chip.

The transformers are connected with the first and second nodes 13 and 14 by electrical lines 61 and 62, respectively, which can be arranged in a third, lowermost or deepest metallization layer $M_{n-2}$ of the silicon chip, which is disposed lower than the second metallization layer $M_{n-1}$. At points 63 and 64 vertical interconnections are formed between the electrical lines 61 or 62 and the inductors and between the inductors themselves.

Figure 8:
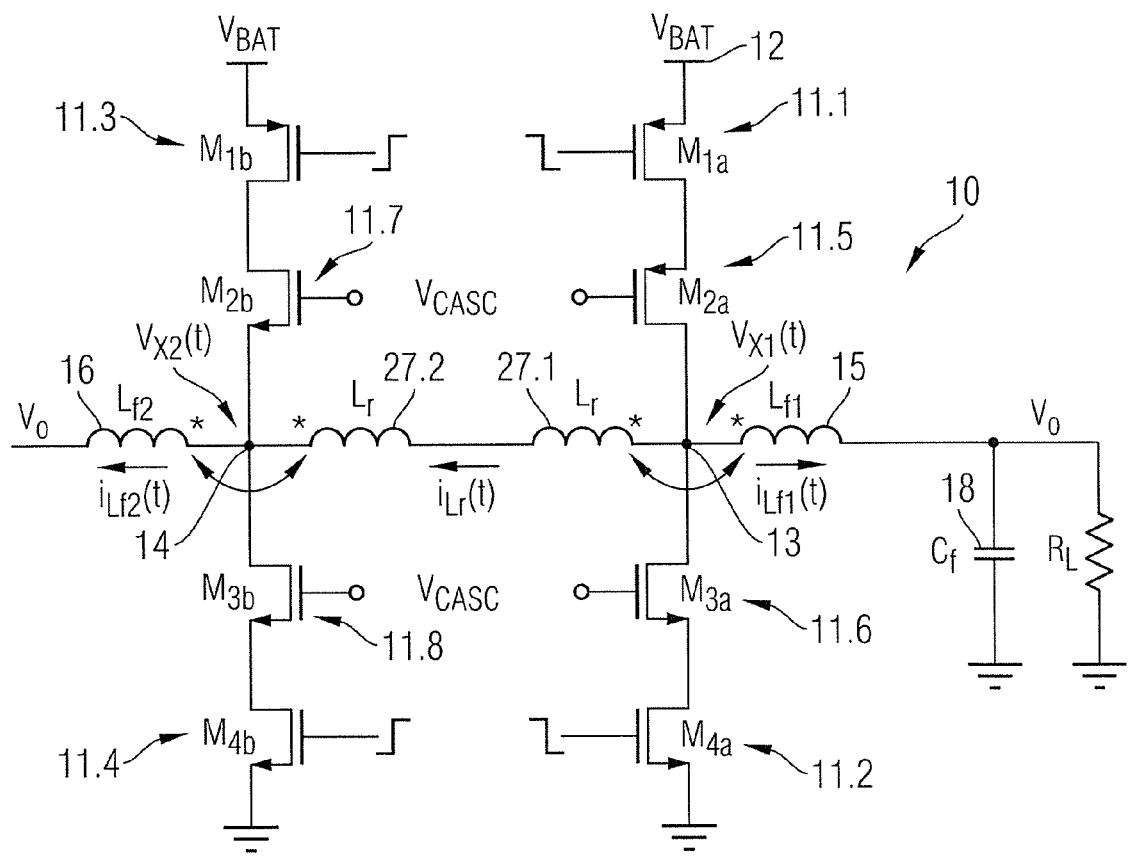
FIG. 8 illustrates a circuit representation of an exemplary switched-mode power supply according to the disclosure.

FIG. 8 illustrates a circuit representation of an exemplary switched-mode power supply according to the disclosure. The switched-mode power supply 70 of FIG. 8 is similar to the switched-mode power supply 20 of FIG. 3 so that, as far as like reference numerals are used again in FIG. 8, the description of the respective elements will not be repeated here. Instead only further elements not mentioned before will be described in the following. The switched-mode power supply 70 further comprises a fifth switch 11.5 connected in series between the first switch 11.1 and the first node 13, a sixth switch 11.6 connected in series between the second switch 11.2 and the first node 13, a seventh switch 11.7 connected in series between the third switch 11.3 and the second node 14, and an eighth switch 11.8 connected in series between the fourth switch 11.4 and the second node 14.

In general, the switched-mode power supplies of the disclosure can be fabricated in a CMOS technology. The fifth to eighth switches 11.5 to 11.8 of FIG. 8 are connected in a cascode configuration with the first to fourth switches 11.1 to 11.4, respectively, to solve the break-down problem of advanced CMOS processes. Each one of the fifth to eighth switches 11.5 to 11.8 can thus be connected to one and the same voltage source providing a voltage $V_{CASC}$ which can, for example, be equal to $V_{BAT}/2$. The fifth switch 11.5 and the seventh switch 11.7 can be made of transistors of the first conductivity type, and the sixth switch 11.6 and the eighth switch 11.8 can be made of transistors of the second conductivity type. Therefore, the first, third, fifth, and seventh switches 11.1, 11.3, 11.5 and 11.7 can be made of PMOS transistors, and the second, fourth, sixth, and eighth switches 11.2, 11.4, 11.6 and 11.8 can be made of NMOS transistors. It should be added that each one of the fifth to eighth switches 11.5 to 11.8 can be replaced by two or more respective switches for further enhancing the withstand voltage or further reducing the break-down problem.

Figure 9:
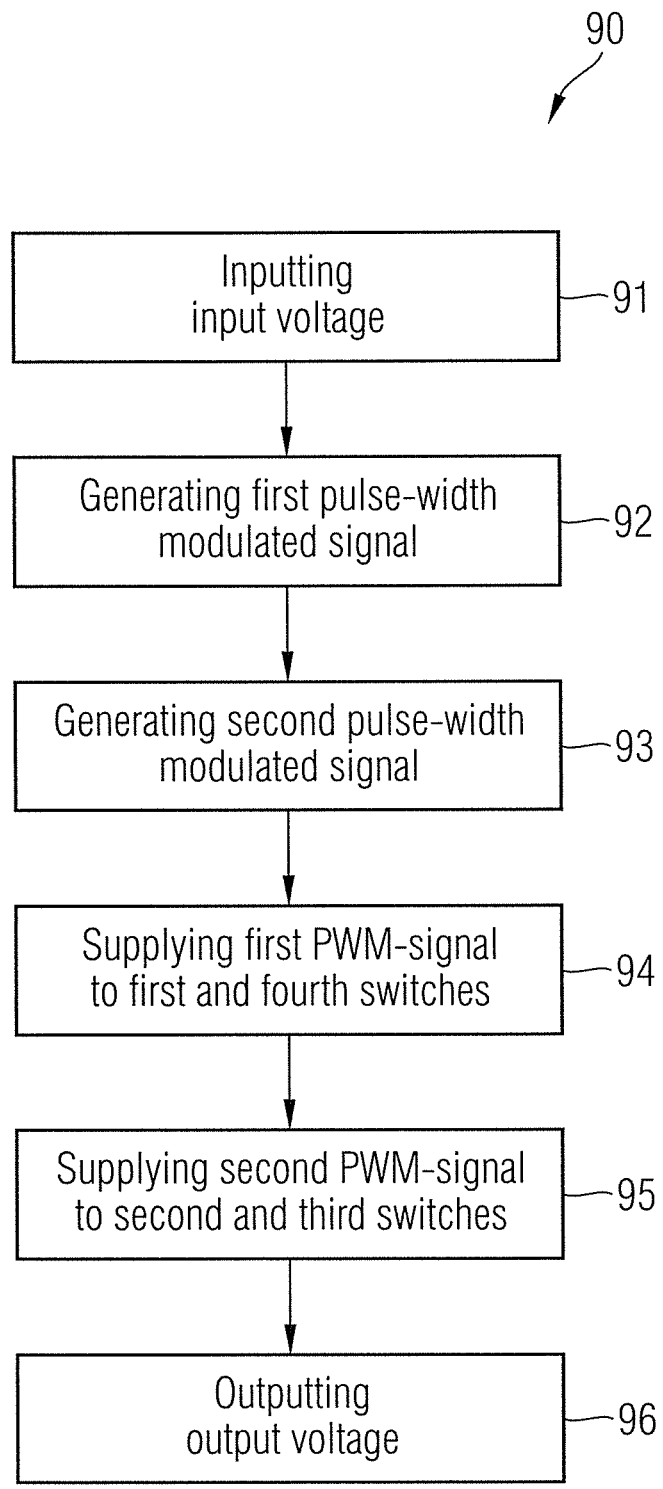
FIG. 9 illustrates a flow diagram for an exemplary method for operating a switched-mode power supply according to the disclosure.

FIG. 9 illustrates a flow diagram of an exemplary method for operating a switched-mode power supply according to the disclosure. The method 90 of FIG. 9 comprises inputting an input voltage 91, generating a first pulse-width modulated signal 92, generating a second pulse-width modulated signal in an interleaved relationship to the first pulse-width modulated signal 93, supplying the first pulse-width modulated signal to a first set of switches 94, supplying the second pulse-width modulated signal to a second set of switches 95, and outputting an output voltage based on a signal obtained from the first and second sets of switches 96.

It is to be understood that each one of the manifold features and embodiments that were described above in connection with FIGS. 1-8 can be applied to the method 90 of FIG. 9.

In particular, method 90 may further comprise adjusting a duty-cycle between the first and second pulse-width modulated signals in accordance with a desired output voltage.

Method 90 may further comprise outputting an output voltage comprising LC filtering signals obtained from a first node between the first set of switches and from a second node between the second set of switches, and supplying the LC filtered signals to an output terminal.

Method 90 may further comprise generating an inductive current flowing to either one of the first and second nodes.

Method 90 may further comprise providing the first set of switches as first and second switches and providing the second set of switches as third and fourth switches.

The switched-mode power supply may further comprise a fifth switch connected between the first switch and the first node, a sixth switch connected between the second switch and the first node, a seventh switch connected between the third switch and the second node, and an eighth switch connected between the fourth switch and the second node, and method 90 may further comprise applying one and the same constant voltage to each one of the fifth to eighth switches, wherein the constant voltage can, in particular, be one half of the input voltage.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

What is claimed is:

1. A switched-mode power supply, comprising:
a first switch and a third switch coupled to an input voltage;
a second switch coupled to the first switch via a first node;
a fourth switch coupled to the third switch via a second node;
a first inductor connected between the first node and an output voltage;
a second inductor connected between the second node and the output voltage;
at least one third inductor, comprising a first terminal and a second terminal, connected between the first node and the second node, wherein the first terminal of the at least one third inductor is directly connected to the first node and the second terminal of the at least one third inductor is directly connected to the second node; and
a capacitor connected to the output voltage;
wherein the first switch and the second switch are configured to control the first node to divide a current flowing into the first node and through the first switch into a first current flowing out of the first node and through the first inductor and a second current flowing out of the first node and through the at least one third inductor, wherein the first current is different in magnitude than the second current.

2. The switched-mode power supply according to claim 1, wherein the at least one third inductor comprises a plurality of third inductors connected in series between the first node and the second node.

3. The switched-mode power supply according to claim 2, wherein each one of the plurality of third inductors is magnetically coupled to the first inductor or the second inductor.

4. The switched-mode power supply according to claim 2, further comprising:
a first transformer comprising a first primary winding and a first secondary winding, wherein the first primary winding is comprised of the first inductor and the first secondary winding is comprised of one of the plurality of third inductors; and
a second transformer comprising a second primary winding and a second secondary winding, wherein the second primary winding is comprised of the second inductor and the second secondary winding is comprised of another one of the plurality of third inductors.

5. The switched-mode power supply according to claim 4, further comprising:
a semiconductor chip arranged in a package, wherein at least one of the semiconductor chip or the package comprises two or more metal layers, wherein the first, second, third, and fourth switches and the first and second transformers are arranged in the semiconductor chip, wherein
the first primary winding of the first transformer and the second primary winding of the second transformer are disposed in a first metal layer and the first secondary winding of the first transformer and the second secondary winding of the second transformer are disposed in a second metal layer.

6. The switched-mode power supply according to claim 1, further comprising:
a semiconductor chip arranged in a package, wherein
at least one of the capacitor, the first inductor, the second inductor or the at least one third inductor is arranged in the semiconductor chip or in the package.

7. The switched-mode power supply according to claim 1, wherein:
the first switch and the third switch comprise transistors of a first conductivity type; and
the second switch and the fourth switch comprise transistors of a second, different conductivity type.

8. The switched-mode power supply according to claim 1, further comprising:
a fifth switch connected between the first switch and the first node;
a sixth switch connected between the second switch and the first node;
a seventh switch connected between the third switch and the second node; and
an eighth switch connected between the fourth switch and the second node.

9. The switched-mode power supply according to claim 8, further comprising:
the first switch, the third switch, the fifth switch and the seventh switch comprise transistors of a first conductivity type; and
the second switch, the fourth switch, the sixth switch and the eighth switch comprise transistors of a second, different conductivity type.

10. The switched-mode power supply according to claim 8, further comprising:
the fifth switch, the sixth switch, the seventh switch, and the eighth switch connected to a same voltage source.

11. The switched-mode power supply according to claim 1, wherein a maximum of the first current is greater than a maximum of the second current, and the maximum of the second current is greater than a minimum of the first current.

12. The switched-mode power supply according to claim 1, further comprising:
one or more pulse generators configured to generate and supply a first pulse-width modulated signal to the first switch and the fourth switch, and generate and supply a second pulse-width modulated signal to the second switch and the third switch.

13. The switched-mode power supply according to claim 12, wherein the one or more pulse generators are configured to generate the first pulse width modulated signal and the second pulse width modulated signal in an interleaved manner.

14. A switched-mode power supply, comprising:
a first switch and a second switch;
the first switch configured to switch an input voltage to a first node between the first switch and the second switch;
the second switch configured to switch a ground potential to the first node; a third switch and a fourth switch;
the third switch configured to switch the input voltage to a second node between the third switch and the fourth switch;
the fourth switch configured to switch the ground potential to the second node; a first LC filter and a second LC filter, the first LC filter and the second LC filter configured to filter signals obtained from the first node and the second node and supply the filtered signals to an output terminal; and
at least one auxiliary inductor, comprising a first terminal and a second terminal, configured to generate an inductive current flowing to either one of the first node and the second node, wherein the first terminal of the at least one auxiliary inductor is directly connected to the first node and the second terminal of the at least one auxiliary inductor is directly connected to the second node;
wherein the first switch and the second switch are configured to control the first node to divide a current flowing into the first node and through the first switch into a first current flowing out of the first node and through the first LC filter and a second current flowing out of the first node and through the at least one auxiliary inductor, wherein the first current is different in magnitude than the second current.

15. The switched-mode power supply according to claim 14, wherein the first LC filter is comprised of an output capacitor and a first inductor, and the second LC filter is comprised of the output capacitor and a second inductor.

16. The switched-mode power supply according to claim 14, further comprising:
a plurality of auxiliary inductors connected in series between the first node and the second node.

17. The switched-mode power supply according to claim 16, wherein each one of the plurality of auxiliary inductors is magnetically coupled to one of the first inductor and the second inductor.

18. The switched-mode power supply according to claim 14, further comprising:
one or more pulse generators configured to generate and supply a first pulse-width modulated signal to the first and fourth switches and generate and supply a second pulse-width modulated signal to the second and third switches.

19. The switched-mode power supply according to claim 18, wherein the one or more pulse generators are configured to generate the first pulse-width modulated signal and the second pulse-width modulated signal in an interleaved manner.

20. A two-phase DC to DC converter, comprising:
a first converter stage comprising a first switch, a second switch, and a first inductor; a second converter stage comprising a third switch, a fourth switch, and a second inductor;
an output capacitor coupled to the first converter stage and the second converter stage; and
at least one third inductor, comprising a first terminal and a second terminal, connected between a first node of the first converter stage and a second node of the second converter stage, wherein the first terminal of the at least one third inductor is directly connected to the first node and the second terminal of the at least one third inductor is directly connected to the second node;
wherein the first switch and the second switch are configured to control the first node to divide a current flowing into the first node and through the first switch into a first current flowing out of the first node and through the first inductor and a second current flowing out of the first node and through the at least one third inductor, wherein the first current is different in magnitude than the second current.

21. The two-phase DC to DC converter according to claim 20, further comprising:
the first converter stage further comprising a first node between the first switch and the second switch;
the second converter stage further comprising a second node between the third switch and the fourth switch; wherein
the at least one third inductor connected between the first node and the second node.

22. The two-phase DC to DC converter according to claim 20, further comprising:
a plurality of third inductors connected in series between the first converter stage and the second converter stage.

23. The two-phase DC to DC converter according to claim 22, wherein each one of the plurality of third inductors is magnetically coupled to one of the first inductor or the second inductor.

24. The two-phase DC to DC converter according to claim 22, further comprising:
a first transformer comprising a first primary winding and a first secondary winding, wherein the first primary winding is comprised of the first inductor and the first secondary winding is comprised of one of the plurality of third inductors; and
a second transformer comprising a second primary winding and a second secondary winding, wherein the second primary winding is comprised of the second inductor and the second secondary winding is comprised of another one of the plurality of third inductors.

25. The two-phase DC to DC converter according to claim 20, further comprising:
one or more pulse generators configured to generate and supply a first pulse-width modulated signal to the first switch and the fourth switch and generate and supply a second pulse-width modulated signal to the second switch and the third switch.

26. The two phase DC to DC converter according to claim 25, wherein the one or more pulse generators are configured to generate the first pulse-width modulated signal and the second pulse-width modulated signal in an interleaved manner.

27. A method for operating a switched-mode power supply, comprising:
- inputting an input voltage;
- generating a first pulse-width modulated signal;
- generating a second pulse-width modulated signal in an interleaved relationship to the first pulse-width modulated signal;
- supplying the first pulse-width modulated signal to a first set of switches;
- supplying the second pulse-width modulated signal to a second set of switches;
- LC filtering signals obtained from a first node between the first set of switches and from a second node between the second set of switches by using a first LC filter and a second LC filter, wherein
- the LC filtering comprises dividing a current flowing into the first node and through the first switch into a first current flowing out of the first node and through the first LC filter and a second current flowing out of the first node and through at least one auxiliary inductor directly connected to the first node and the second node, and the first current is different in magnitude than the second current;
- supplying the LC filtered signals to an output terminal; and
- outputting an output voltage based on the supplied LC filtered signals.

28. The method according to claim 27, further comprising:
- adjusting a duty cycle between the first pulse-width modulated signal and the second pulse-width modulated signal in accordance with a desired output voltage.

29. The method according to claim 27, further comprising:
- controlling zero voltage switching of the first node with the second current flowing through the at least one auxiliary inductor; and
- generating an inductive current flowing to either one of the first node and the second node.

\* \* \* \* \*